Dec. 12, 1967   F. TÓTH   3,358,268
MEANS FOR MEASURING SEISMIC VIBRATION
OF LOW NATURAL FREQUENCY
Filed Sept. 6, 1966   2 Sheets-Sheet 1

INVENTOR

FERENC TÓTH

BY Young + Thompson

ATTORNEYS

Dec. 12, 1967  F. TÓTH  3,358,268
MEANS FOR MEASURING SEISMIC VIBRATION
OF LOW NATURAL FREQUENCY
Filed Sept. 6, 1966  2 Sheets-Sheet 2

INVENTOR
FERENC TÓTH

BY Young + Thompson

ATTORNEYS

United States Patent Office 3,358,268
Patented Dec. 12, 1967

3,358,268
MEANS FOR MEASURING SEISMIC VIBRATION OF LOW NATURAL FREQUENCY
Ferenc Tóth, Budapest, Hungary, assignor to Metrimpex Magyar Muszeripari Kulkereskedelmi Vallalat, Budapest, Hungary
Filed Sept. 6, 1966, Ser. No. 577,541
5 Claims. (Cl. 340—17)

ABSTRACT OF THE DISCLOSURE

A statically and dynamically balanced flywheel is interconnected with an eccentric mass that has a much smaller moment of inertia about the axis of the flywheel. The eccentric mass is spring-urged to a rest position, and damping means are provided for the oscillations of the flywheel and eccentric mass. The flywheel greatly reduces the natural frequency of the mass and spring.

---

The invention relates to means for measuring seismic vibration of low natural frequency, to measure low frequencies without any fixed points.

It is often necessary to measure the oscillation in the case of structures of large dimensions, but fixed points are not available. For this type of measurement seismic measuring instruments are employed.

The natural frequency of these instruments should be kept at a lower value than that of the structure to be measured. In this case the oscillating means of the instrument remains approximately fixed during the measuring process and can be used as a fixed point. Certain structures, as bridges, chimneys, towers, etc. are very large and their natural frequency is low. When the natural frequency of the instruments is higher than that of the structure the relative displacement of the oscillation between instrument and structure is proportional to the amplitude of the acceleration of the structure oscillation. The oscillogram plotted with such an instrument should be integrated at least twice to calculate oscillation of the structure. The integration of low-frequency oscillations is difficult and requires expensive, highly stable amplification.

The known instruments have the following disadvantages:

(1) Their natural frequency is comparatively high, thus no direct measurement of displacement is possible for large structures.

(2) For the measurement of frequencies lower than 1.5 times the natural frequency of the measuring instrument two or three amplifiers are required.

(3) It is impossible to vary mechanically the sensitivity of the instruments.

The natural frequency of these instruments can be theoretically decreased either by increasing the seismic mass or by employing a soft spring. In the first case the structure becomes too large, in the second case the spring becomes too large. Neither of them can be executed in practice because of the resulting large dimensions and instable fixed points.

It is the object of the invention to provide an instrument the natural frequency of which is lower than that of the known instruments and thus is suitable for measuring oscillation also when there is no fixed point. Therefore the seismic mass—principal mass—of the instrument will be virtually increased by a rotary mass—additional mass—having a large moment of inertia. A strong spring may be employed since the effective weight of the additional mass is essentially low.

The instrument according to the invention has a natural frequency of 0.112 Hz., the upper limit of frequency is above 67 Hz. The upper and lower limits of the measured displacement of oscillation can be adjusted and varied in the range of 1 to 100 mm. Natural frequencies of lower order can also be measured and registered.

A further advantage of the instrument according to the invention resides in that it can be equally well used for vertical and horizontal measurements. The instrument is compact and simple in construction, therefore it is dust-proof and shock-proof besides being sensitive. The additional mass can be varied easily and in this way the instrument can be adapted to different measuring limits.

The instrument according to the invention exerts a sufficient amount of force for direct mechanical registration without the need for amplification. Hence, mechanical, optical or other recording means can be coupled to the instrument. The statistical distribution curve can be determined exactly without an external electrical source.

The invention will be further described by way of example in accordance with the attached drawings in which FIG. 1 shows a side view of an embodiment of the instrument according to the invention.

Figures 1, 2:
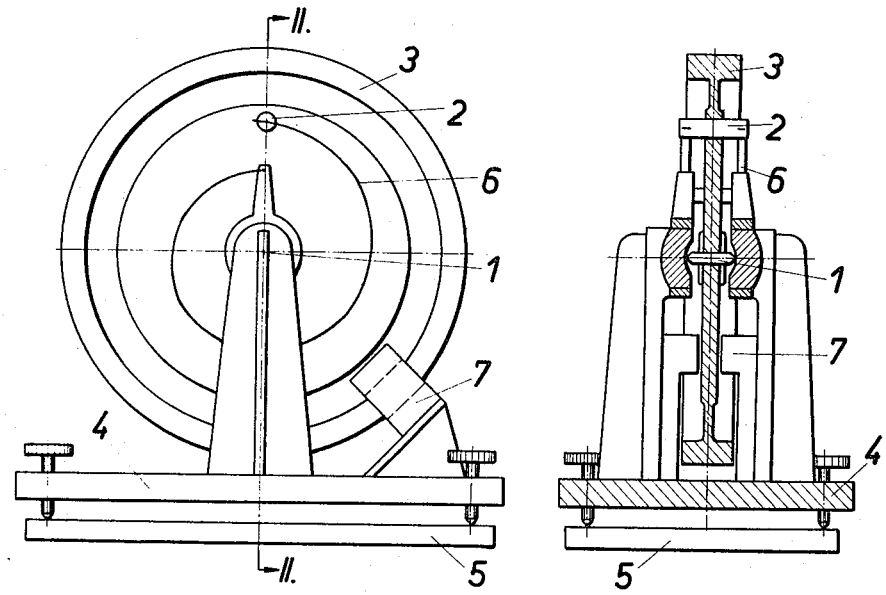
FIG. 2 shows a cross section on the line II—II of FIG. 1.
Figure 3:
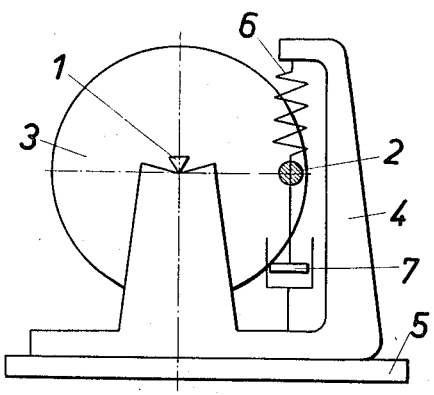
FIGS. 3 and 4 show schematically the arrangement of the masses.
Figure 4:
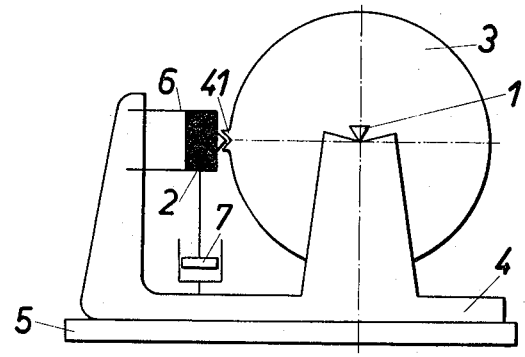
Figure 5:
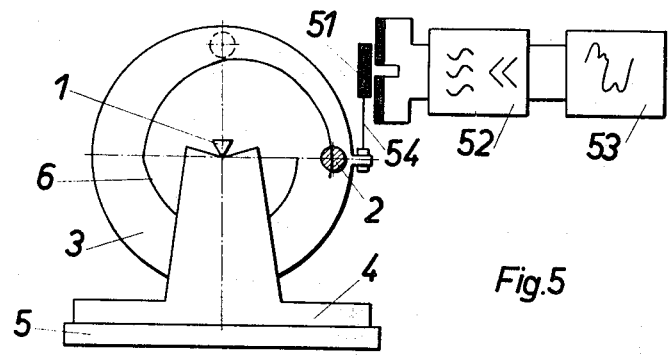
FIGS. 5 and 6 show schematic diagrams of the registration.
Figure 6:
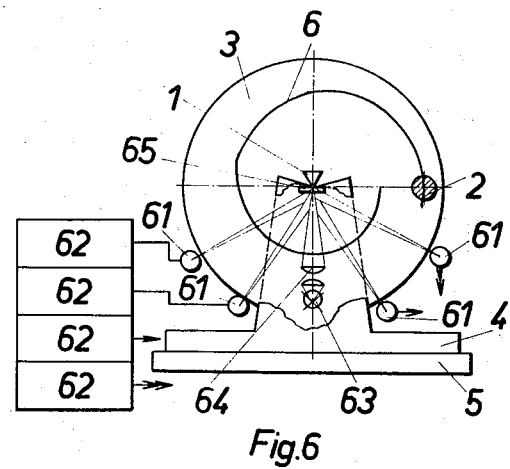

In FIG. 1 the housing 4 of the instrument is arranged on the body 5 of the structure to be measured. To said housing 4 a principal mass 2 is linked with an inserted spring 6 as in the known seismic instruments. These two, spring 6 and principal mass 2 form a seismic system. In said housing 4 a bearing is formed, such as a wedge bearing in which an axle 1 can pivot. A dynamically and statically balanced additional rotatable body 3, e.g. a wheel is mounted on said axle 1. The principal mass 2 can be connected with the additional mass either in a manner to prevent relative turning (FIG. 3) or by means of a wedge bearing 41 so as to permit relative turning (FIG. 4). The mass of said additional body 3 is large, either if its inertia moment is great or if the radius between the center of the body 3 and the principal mass 2 is large. The mass of the body 3 virtually increases the principal mass 2 so that a relatively hard spring can be used and the displacement of oscillation is large enough to be measured without amplifiers.

In the case of vertical oscillation the spring 6 has a secondary purpose, that is, the spring is not only a member of the seismic system which it forms but it balances the torque of said principal mass 2 on said axle 1. Between the housing 4 and said additional mass 3 or said principal mass 2 damping means 7 are arranged for damping the oscillation motion of said masses.

In the instrument according to the invention the oscillation of the principal mass 2 can be registered by means of the known oscillation displacement converter 51. This is connected to the rotary additional mass 3 by a shaft 54. The converter 51 transforms the mechanical oscillations into alternating voltage which can be registered by a carrier frequency amplifier 52 and a light-strain oscillograph 53.

With the instrument according to the invention it is possible to analyse statistical distribution curves in a very simple manner. On the housing 4 a luminous source 63 is mounted, which emits rays of lights. These rays arrive through condenser lens 64 onto a mirror 65 which is mounted on the additional mass 3 to rotate with it and from here to photo transistors 61. When the displacement of oscillation is larger than the predetermined oscillation, said photo transistors 61 give a voltage signal to the counters 62. Taking the readings from each counter the corresponding curve can be determined.

What I claim is:

1. A seismic vibration measurer of low natural frequency comprising, in combination, a housing to be supported by a body the frequency of which is to be measured, flywheel means mounted on said housing and statically and dynamically balanced for rotation about a fixed axis, a mass eccentric to said axis and that is dynamically unbalanced about said axis, means interconnecting said flywheel means and said mass for conjoint movement, spring means interconnecting said housing and said mass, and damping means on said housing for damping oscillating motions of said mass and flywheel means.

2. A seismic vibration measurer as claimed in claim 1, the moment of inertia of said flywheel means about said axis being substantially greater than the moment of inertia of said mass about said axis.

3. A seismic vibration measurer as claimed in claim 1, and an axle carried by said housing, said flywheel means being mounted for rotation on said axle about said axis.

4. A seismic vibration measurer as claimed in claim 3, said mass and said axle being interconnected by said flywheel means.

5. A seismic vibration measurer as claimed in claim 4, the moment of inertia of said flywheel means about said axis being substantially greater than the moment of inertia of said mass about said axis.

References Cited

UNITED STATES PATENTS

| | | | |
|---|---|---|---|
| 1,552,186 | 10/1925 | Anderson | 340—17 |
| 2,909,759 | 10/1959 | Cook | 340—17 |
| 3,011,147 | 11/1961 | Geneslay | 340—17 |
| 3,212,057 | 10/1965 | Romberg | 340—17 |
| 2,861,789 | 11/1958 | Pope | 73—517 X |
| 2,839,922 | 6/1958 | Manildi | 73—517 X |

FOREIGN PATENTS 1,060,073   3/1954   France.

OTHER REFERENCES

Taylor, Engineering, Apr. 11, 1952, p. 473.

BENJAMIN A. BORCHELT, *Primary Examiner.*

SAMUEL FEINBERG, *Examiner.*

P. A. SHANLEY, R. M. SKOLNIK,
*Assistant Examiners.*